United States Patent
Lee et al.

(10) Patent No.: US 7,289,439 B2
(45) Date of Patent: Oct. 30, 2007

(54) METHOD FOR IMPLEMENTING VARIOUS FUNCTIONS IN GIGABIT ETHERNET-PASSIVE OPTICAL NETWORK SYSTEM AND STRUCTURE OF ETHERNET FRAME EMPLOYED IN THE SAME

(75) Inventors: Min-Hyo Lee, Suwon-shi (KR); Tae-Sung Park, Suwon-shi (KR); Shin-Hee Won, Seoul (KR); Whan-Jin Sung, Suwon-shi (KR); Soon-Ho Jang, Songnam-shi (KR); Su-Hyung Kim, Songnam-shi (KR); Do-In Choi, Seoul (KR)

(73) Assignee: Samsung Electronics Co., Ltd., Maetan-Dong, Yeong Tong-Gil, Suwon-Si, Gyeonggi-Do (KR)

( * ) Notice: Subject to any disclaimer, the term of this patent is extended or adjusted under 35 U.S.C. 154(b) by 1098 days.

(21) Appl. No.: 10/306,446

(22) Filed: Nov. 27, 2002

(65) Prior Publication Data
US 2003/0133460 A1 Jul. 17, 2003

(30) Foreign Application Priority Data
Jan. 17, 2002 (KR) .................................. 2002-2765

(51) Int. Cl.
*H04J 1/16* (2006.01)
(52) U.S. Cl. ..................... 370/229; 370/503; 398/58
(58) Field of Classification Search ........... 370/395.43, 370/395.51, 443, 395.21, 395.1, 252, 253, 370/412, 503, 389, 466, 241.1, 236.2, 229; 398/58, 71; 455/435.1
See application file for complete search history.

(56) References Cited

U.S. PATENT DOCUMENTS

| | | | | |
|---|---|---|---|---|
| 5,761,197 | A | 6/1998 | Takefman | 370/337 |
| 5,850,400 | A | 12/1998 | Eames et al. | 370/443 |
| 5,966,163 | A | 10/1999 | Lin et al. | 348/12 |
| 6,262,997 | B1 | 7/2001 | Quayle | 370/503 |
| 6,470,032 | B2 * | 10/2002 | Dudziak et al. | 370/503 |
| 6,633,541 | B1 * | 10/2003 | Hijikata et al. | 370/231 |
| 6,636,527 | B1 * | 10/2003 | Lee et al. | 370/465 |

FOREIGN PATENT DOCUMENTS

| | | | |
|---|---|---|---|
| CN | 1189267 A | | 7/1998 |
| EP | 0337619 A1 | | 10/1989 |
| EP | 0727883 A2 | | 8/1996 |
| EP | 1 311 137 A2 | * | 5/2003 |
| GB | 2349315 A | | 10/2000 |
| WO | WO9719567 | | 5/1997 |

* cited by examiner

*Primary Examiner*—Chi Pham
*Assistant Examiner*—Alexander O. Boakye
(74) *Attorney, Agent, or Firm*—Cha & Reiter, LLC

(57) ABSTRACT

A GE-PON (Gigabit Ethernet-Passive Optical Network) system is provided that configures upstream and downstream frames on the basis of a variable-length Ethernet frame. The GE-PON system employs TDM (Time Division Multiplexing) for upstream packet transmission in a tree structure for a point-to-multipoint connection. A structure of a frame format is also provided that is capable of effectively accommodating Gigabit Ethernet traffic in the GE-PON system and a method is provided for implementing various functions such as initial ONU registration, late ONU registration, ranging, and dynamic bandwidth allocation in the GE-PON system.

10 Claims, 13 Drawing Sheets

| PACKET | | | | | | | | |
|---|---|---|---|---|---|---|---|---|
| ADDED BY TRANSMITTER, STRIPPED BY RECEIVER | | DATA FRAME (SENT BY USER) | | | | | | ADDED BY TRANSMITTER (OPTION) |
| | | | DATA FRAME (DELIVERED TO USER, ONLY CRC IS OPTIONALLY STRIPPED BY RECEIVER) | | | | | |
| | S F D | DESTINATION ADDRESS | SOURCE ADDRESS | TYPE | LLC DATA | PAD | CRC | |
| PREAMBLE | | | | | | | | |
| 7BYTES | 1 | 6BYTES | 6BYTES | 2 | 0~1500 | 0~46 | 4BYTES | |
| | | | | HIGH-LOW | MSB ... LSB | | | |

FIG.1
(PRIOR ART)

REGISTRATION REQUEST FRAME

REGISTRATION RESPONSE FRAME

RANGING REQUEST FRAME

RANGING RESPONSE FRAME

BANDWIDTH ALLOCATION REQUEST FRAME

- DD : Down-stream Delay
- UD : Up-stream Delay
- RTT : Round Trip Time
- RD(x) : Random Delay generated at each ONU

METHOD FOR IMPLEMENTING VARIOUS FUNCTIONS IN GIGABIT ETHERNET-PASSIVE OPTICAL NETWORK SYSTEM AND STRUCTURE OF ETHERNET FRAME EMPLOYED IN THE SAME

CLAIM OF PRIORITY

This application claims priority from an application entitled "METHOD FOR IMPLEMENTING VARIOUS FUNCTIONS IN GIGABIT ETHERNET-PASSIVE OPTICAL NETWORK SYSTEM AND STRUCTURE OF ETHERNET FRAME EMPLOYED IN THE SAME", filed in the Korean Industrial Property Office on Jan. 17, 2002 and assigned Serial No. 2002-2765, the contents of which are hereby incorporated by reference.

BACKGROUND OF THE INVENTION

1. Field of the Invention

The present invention relates to a passive optical network, and more particularly to a method for implementing various functions in a Gigabit Ethernet-Passive Optical Network (GE-PON) system and a structure of an Ethernet frame employed in same.

2. Description of the Related Art

To configure an optical subscriber network from a central office to a building or general home, a variety of network architectures such as an x-Digital Subscriber Line (xDSL), Hybrid Fiber Coax (HFC), Fiber To The Building (FTTB), Fiber To The Curb (FTTB), Fiber To The Home (FTTH), etc. have been proposed. Among these network architectures, an FTTx (x=B, C or H) can be divided into an active FTTx based on a configuration of an AON (Active Optical Network) and a passive FTTx based on a configuration of a PON (Passive Optical Network). Because the PON is a network configuration having a point-to-multipoint topology, it is considered to be an optical subscriber network, which will be economical in the future.

The PON is the optical subscriber network forming a distributed topology having a tree structure in which one Optical Line Termination (OLT) and a plurality of Optical Network Units (ONU) are coupled via a "1×N" passive optical splitter. Recently, in an International Telecommunication Union—Telecommunication section (ITU-T) standard, an Asynchronous Transfer Mode-Passive Optical Network (ATM-PON) system based on a point-to-multipoint connection has been defined in documents relating to an ITU-T G.982, ITU-T G.983.1 and ITU-T G.983.3. Further, standardization for a GE-PON system based on a point-to-multipoint connection is in progress in Institute of Electrical and Electronics Engineers (IEEE) 802.3ah TF.

The Gigabit Ethernet based on the point-to-point connection and a technology associated with a Medium Access Control (MAC) for the ATM-PON based on the point-to-multipoint connection have already been standardized, see IEEE 802.3z and ITU-T G.983.1. For example, U.S. Pat. No. 5,978,374, entitled "PROTOCOL FOR DATA COMMUNICATION OVER A POINT-TO-MULTIPOINT PASSIVE OPTICAL NETWORK", issued Nov. 2, 1999, to Ghaibeh, et al. discloses the technology associated with the MAC for the ATM-PON in detail.

A structure of a standard frame for the Gigabit Ethernet based on the conventional point-to-point connection standardized is shown in FIG. 1. A schematic configuration of a standardized ATM-PON system is shown in FIG. 2. In the standardized Gigabit Ethernet based on the point-to-point connection, various functions are not defined that are required in a PON system based on the point-to-multipoint connection. The ATM-PON has been standardized for the first time as a form of the PON based on the point-to-multipoint connection.

As shown in FIG. 2, the standard ATM-PON system includes one OLT 10, that is located at the root of a tree structure and that provides subscribers of an access network with information. The OLT 10 is coupled to an ODN Optical Distribution Network (ODN) 16 having a tree topology The ODN 16 acts to distribute downstream data frames received from the OLT 10 and multiplexes upstream data frames to transmit the multiplexed data frames to the OLT 10. A plurality of ONUs 12a, 12b and 12c receive the downstream data frames from the ODN 16 to provide termination users 14a, 14b and 14c with the received downstream data frames. The ONUs 12a, 12b and 12c transmit the upstream data frames from the termination users 14a, 14b and 14c to the ODN 16. In FIG. 2, the termination users 14a, 14b and 14c include a variety of termination devices, which can be used in the PON including a Network Terminal (NT).

The ATM-PON system as shown in FIG. 2 performs downstream or upstream packet transmission of ATM cells in the form of a frame having a constant size of 53 bytes. In the PON having the tree structure shown in FIG. 2, the OLT 10 inserts downstream ATM cells into downstream frames to be distributed to the ONUs 12a, 12b and 12c. In the upstream transmission, the OLT 10 accesses upstream data received from the ONUs 12a, 12b and 12c on the basis of Time Division Multiplexing (TDM). At this time, the ODN 16 connected between the OLT 10 and the ONUs 12a, 12b and 12c is a passive device. Accordingly, the OLT 10 avoids causing data collision in the passive device of the ODN 16 by employing a virtual distance correction using a ranging algorithm. Further, when the OLT 10 transmits downstream data to the ONUs 12a, 12b and 12c, the OLT 10 and the ONUs 12a, 12b and 12c exchange a secret encryption key for security and an Operations, Administration and Maintenance (OAM) message. A corresponding data field is provided within a dedicated or general ATM cell of an upstream/downstream frame so that the OAM message can be exchanged at a predetermined time interval.

As described above, the ATM-PON system configures upstream and downstream frames on the basis of a constant size ATM cell. The ATM-PON system employs TDM for upstream packet transmission in a tree structure for a point-to-multipoint connection.

As Internet techniques have evolved, subscriber sides have needed greater bandwidth, and, for this reason, a Gigabit Ethernet system is preferred over an ATM system. In order to obtain greater bandwidth, relatively costly equipment is needed in an ATM system and only provides limited bandwidth improvement (e.g., 622 Mbps). Further, an ATM system must segment IP (Internet Protocol) packets. By contrast, relatively inexpensive equipment can be employed in a Gigabit Ethernet system and higher bandwidth (e.g., 1 Gbps) can be provided for end-to-end transmission. Accordingly, the Gigabit Ethernet system is preferred over the ATM system for the PON architecture of a subscriber network.

In the Gigabit Ethernet, a MAC protocol based on point-to-point connection and a collision avoidance scheme have been standardized and a MAC controller chip is commonly used. However, standardization for a GE-PON architecture including the MAC protocol is currently in progress. Further, the point-to-multipoint connection is not implemented by the GE-PON and a format for a frame to be used between an OLT and an ONU in the GE-PON has not been defined.

SUMMARY OF THE INVENTION

Therefore, the present invention has been developed in view of the above needs, and it is an object of the present invention to provide a method for implementing various functions in a GE-PON system.

It is another object of the present invention to provide a frame format capable of effectively accommodating Gigabit Ethernet traffic in a GE-PON system.

It is another object of the present invention to provide a method for implementing various functions such as initial ONU registration, late ONU registration, ranging, and dynamic bandwidth allocation in a GE-PON system.

It is yet another object of the present invention to provide a frame format capable of accommodating all types of layer-2 traffic such as the Ethernet, an ATM, etc. in a GE-PON system.

In accordance with one aspect of the present invention, the above and other objects can be accomplished by the provision of a method for implementing various functions in a GE-PON system comprising an OLT, an ODN having an optical splitter as a passive device, and a plurality of ONUs, the method comprising the steps of:

a) allowing the OLT to periodically transmit a synchronous signal to each of the plurality ONUs after initial drive such that each ONU is synchronized with the OLT in response to the synchronous signal periodically transmitted;

b) allowing the ONU synchronized with the OLT to identify a transmission start time of an initial registration request frame and a transmission time length included in a grant frame and allowing the ONU to transmit the initial registration request frame to the OLT after a random delay in order to avoid collision of initial registration request frames transmitted from the ONUs at the transmission time of the initial registration request frame;

c) allowing the OLT receiving the initial registration request frame to calculate a difference between a predicted frame arrival time and a real frame arrival time, the predicted frame arrival time being predicted from the transmission start time of the initial registration request frame indicated in the grant frame and allowing the OLT to calculate Round Trip Time (RTT) using a random delay value; and d) allowing the OLT to register the ONU requesting an ONU registration in an ONU list after calculating the RTT, give a new ONU ID to the ONU, and transmit a registration response frame including the new ONU ID and the RTT to the ONU requesting the ONU registration.

In accordance with another aspect of the present invention, a method is provided for implementing various functions in a GE-PON system comprising an OLT, an ODN having an optical splitter as a passive device, and a plurality of ONUs, the method comprising the steps of:

a) allowing the OLT and ONUs in synchronization with the OLT on the basis of synchronous signals to transmit and receive data;

b) allowing at least one ONU, newly driven among the ONUs, to be synchronized with a synchronous signal of downstream transmission;

c) allowing the ONU in synchronization with the synchronous signal to identify a transmission start time of a late registration request frame and a transmission time length included in a grant frame and to transmit the late registration request frame to the OLT at a transmission time of the late registration request frame;

d) allowing the OLT receiving the late registration request frame to calculate a difference between a predicted frame arrival time and a real frame arrival time, the predicted frame arrival time being predicted from the transmission start time of the late registration request frame indicated in the grant frame and allowing the OLT to calculate an RTT using a random delay value; and e) allowing the OLT to register the ONU requesting a late ONU registration in an ONU list after calculating the RTT, give a new ONU ID to the ONU, and transmit a registration response frame including the new ONU ID and the RTT to the ONU requesting the late ONU registration.

In accordance with another aspect of the present invention, a method is provided for implementing various functions in a GE-PON system comprising an OLT, an ODN having an optical splitter as a passive device, and a plurality of ONUs, the method comprising the steps of:

a) allowing the OLT to transmit grant frames to the ONUs in order to correct an error caused by an external variation, each grant frame including information relating to an ID of an ONU having a ranging opportunity, a grant start time and a grant time length;

b) allowing the ONU receiving the grant frame to transmit a ranging request frame to the OLT at a next ranging grant start time; and c) allowing the OLT receiving the ranging request frame to calculate an error using a difference between a predicted frame arrival time and a real frame arrival time, the predicted frame arrival time being predicted from the transmission start time of the ranging request frame indicated in the grant frame and allowing the OLT to transmit the ranging response frame including an error correction value based on the calculated error to the ONU requesting ranging.

In accordance with yet another aspect of the present invention, a method is provided for implementing various functions in a GE-PON system comprising an OLT, an ODN having an optical splitter as a passive device, and a plurality of ONUs, the method comprising the steps of:

a) allowing the OLT to transmit grant frames to the ONUs in order to grant a bandwidth allocation request, each grant frame including information relating to the number of registered ONUs, an ID of an ONU having a bandwidth request opportunity, a periodic ranging correction value, a grant time offset and a transmission time length;

b) allowing the ONU receiving the grant frame to transmit a bandwidth allocation request frame including information relating to a size of buffers on transmission standby at a next bandwidth allocation request time to the OLT; and c) after transmitting the bandwidth allocation request frame, allowing the ONU receiving the grant frame to transmit data on the transmission standby for the transmission time length on the basis of the transmission time length information to the OLT.

BRIEF DESCRIPTION OF THE DRAWINGS

The above and other objects, features and other advantages of the present invention can be more clearly understood from the following detailed description taken in conjunction with the accompanying drawings, in which:

FIG. 1 is a view showing a structure of a standard frame in Gigabit Ethernet;

DETAILED DESCRIPTION OF THE PREFERRED EMBODIMENTS

Figure 2:
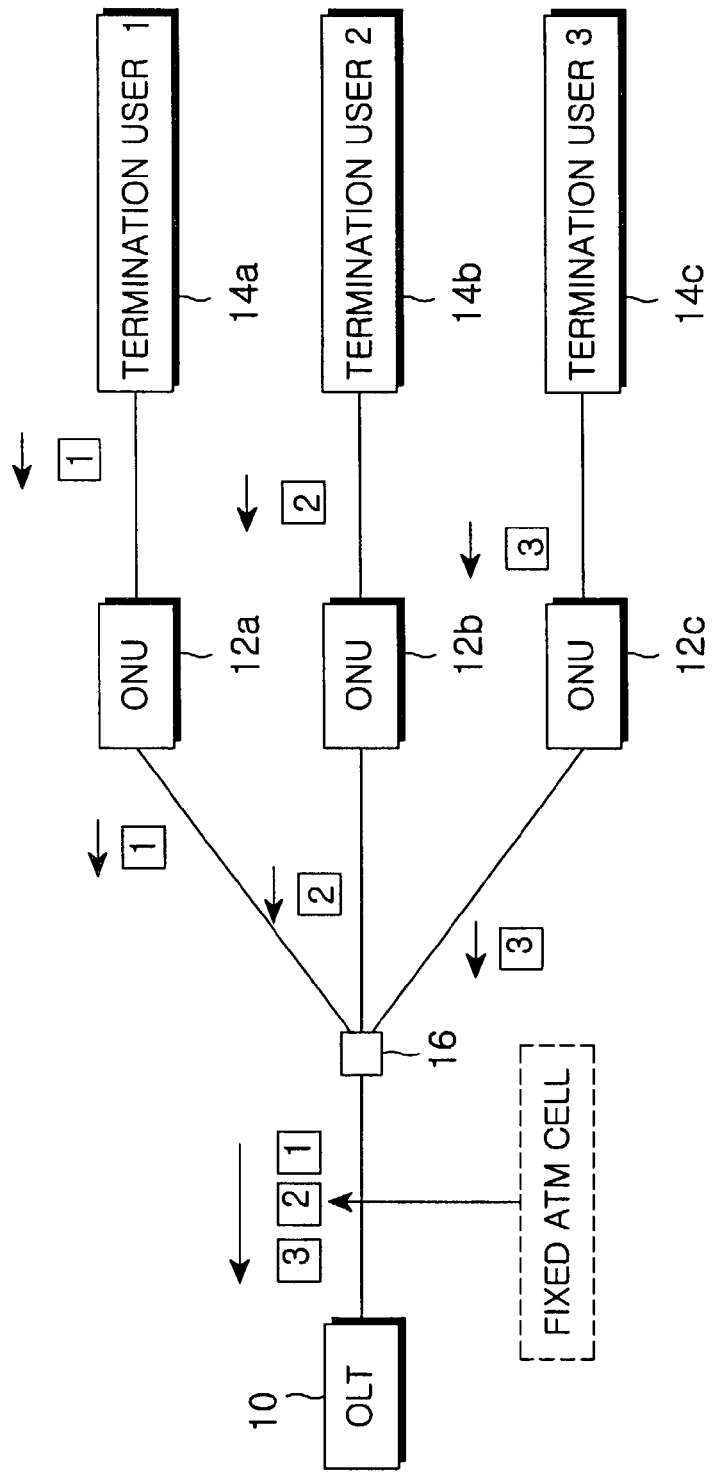
FIG. 2 is a view showing a configuration of an ATM-PON (Asynchronous Transfer Mode-Passive Optical Network) system.

Now, preferred embodiments of the present invention are described in detail with reference to the drawings. In the drawings, the same or similar elements are denoted by the same reference numerals even though they are depicted in different drawings. Further, in the following detailed description of the present invention, a detailed description of known functions and configurations incorporated herein will be omitted when such a discussion is not necessary to the description of the present invention.

Figure 3:
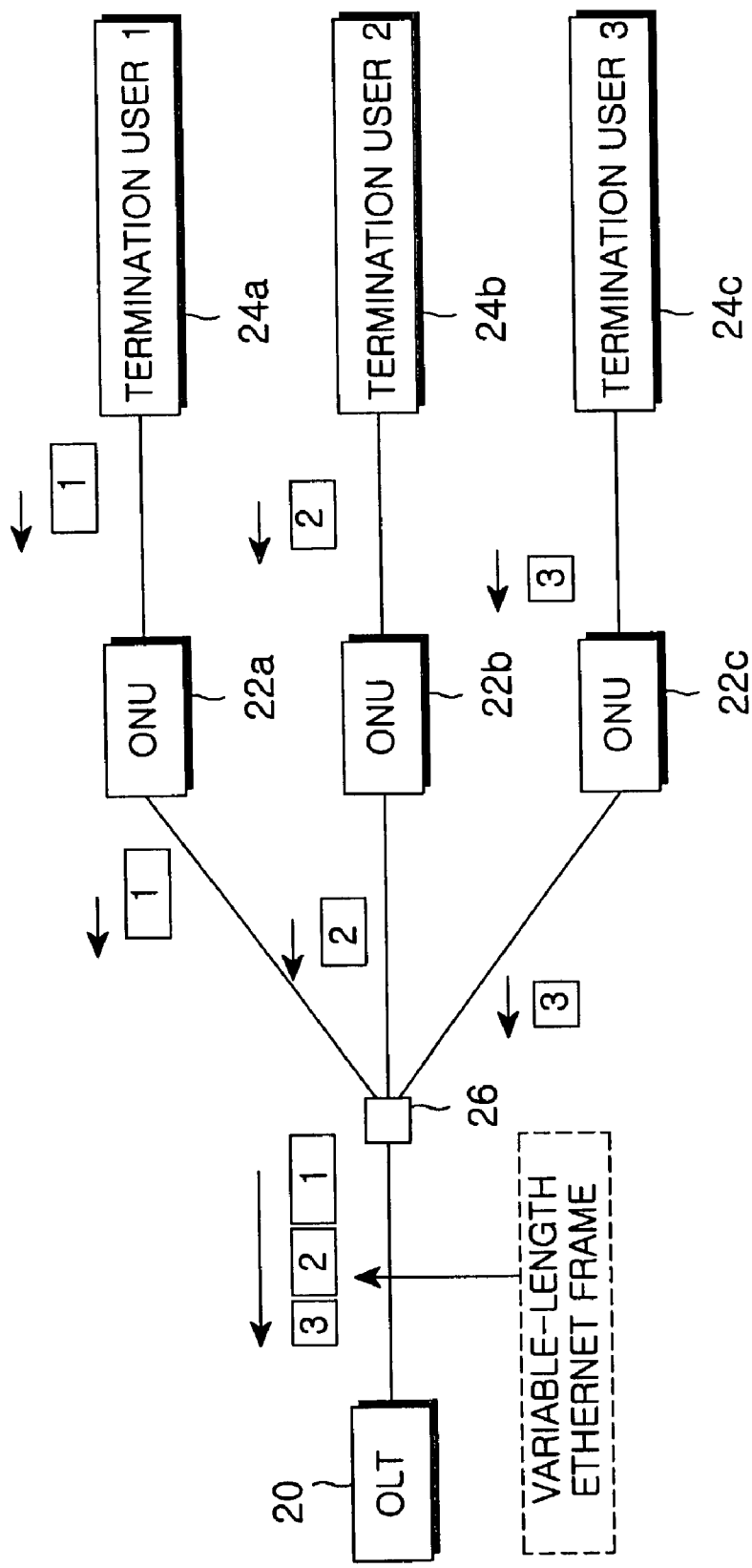
FIG. 3 is a view showing a configuration of a GE-PON (Gigabit Ethernet-Passive Optical Network) system in accordance with the present invention.

FIG. 3 is a view schematically showing a configuration of a GE-PON system in accordance with the present invention.

The GE-PON system shown in FIG. 3 comprises an OLT 20, an ODN 26 having an optical splitter as a passive device, ONUs 22a, 22b and 22c, and termination users 24a, 24b and 24c. A connection structure between components included in the GE-PON system shown in FIG. 3 is similar to that between components included in the ATM-PON system shown in FIG. 2. The GE-PON system shown in FIG. 3 can include one OLT 20 and a maximum of 32 number of ONUs in a tree structure. Here, the maximum of 32 ONUs is determined on the basis of a distance and power budget analysis between the OLT 20 and respective ONUs. The ONUs 22a, 22b and 22c are installed within an Optical Fiber Distribution Housing (OFDH) at a building and apartment complex or near to an entrance of an independent housing development, if necessary. The ONUs 22a, 22b and 22c provide various services such as ADSL (Asynchronous Digital Subscriber Line) services. The OLT 20 receives data from a backbone network. Further, the OLT 20 distributes the received data to the ONUs 22a, 22b and 22c through the ODN 26 or accesses data transmitted from the ONUs 22a, 22b and 22c on the basis of TDM. The present invention is designed so that the OLT 20 basically performs a layer-2 switching function for a MAC hardware address and the ONUs 22a, 22b and 22c perform layer-2 and layer-3 Internet protocol switch/router functions.

The GE-PON system shown in FIG. 3 ensures QoS (Quality of Services) of upstream/downstream data and appropriately maintains a constant level in a PON architecture. The GE-PON system encodes data so that an ONU 22j (j is a, b or c as a natural number and i) cannot read data directed to a particular ONU 22i, i.e., one ONU cannot read data directed to another ONU. The GE-PON system performs an OAM function so that data between the OLT 20 and the ONUs 22a, 22b and 22c can be transmitted when a physical error is caused on communication. After a packet passes through the ODN 26, distances between the OLT 20 and the respective ONUs 22a, 22b and 22c can be different. Accordingly, the GE-PON system performs a ranging function for setting virtual distances as equal between the OLT 20 and the ONUs 22a, 22b and 22c so that data collision is not caused in the ODN 26 when upstream packets are transmitted.

As shown in FIG. 3, the GE-PON system basically configures upstream and downstream frames as variable-length Ethernet frames. The GE-PON system employs TDM for upstream transmission on the basis of a tree structure of a point-to-multipoint connection. In this embodiment, a structure of a format is employed for a variable-length Ethernet frame capable of effectively accommodating Gigabit Ethernet traffic in the GE-PON system. The GE-PON system performs various functions relating to the variable-length Ethernet frames, i.e., initial ONU registration, late ONU registration, ranging, and dynamic bandwidth allocation.

First, the structure of the format of the variable-length Ethernet frame is described in detail with reference to FIGS. 4 to 13. Those skilled in the art will appreciate that various modifications, additions and substitutions for respective field names and positions in the variable-length Ethernet frame are possible without departing from the spirit and scope of the present invention.

Figure 4:
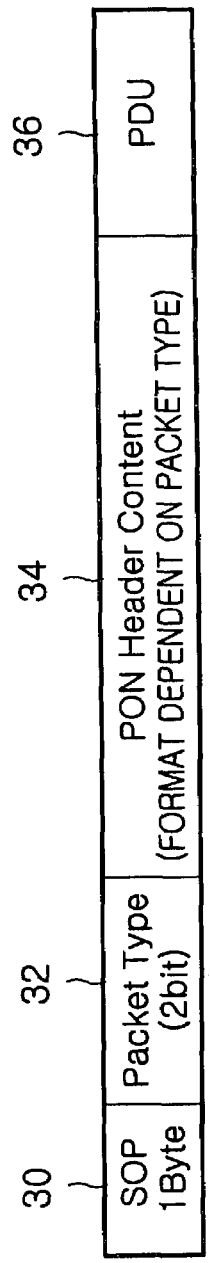
FIG. 4 is a view showing a configuration of a variable-length Ethernet frame as a basic form of data to be transmitted and received between an OLT (Optical Line Termination) and a plurality of ONUs (Optical Network Units) in a GE-PON system in accordance with the present invention.

FIG. 4 is a view showing a configuration of the variable-length Ethernet frame comprising the format of the data to be transmitted and received between the OLT 20 and the ONUs 22a, 22b and 22c in the GE-PON system in accordance with the present invention. As shown in FIG. 4, the variable-length Ethernet frame comprises a 1-byte SOP (Start Of Packet) field 30, a 2-bit packet type field 32, a PON header content field 34 and a PDU (Packet Data Unit) field 36. The SOP field 30 is a field in which SOP information is recorded that indicates a start of a packet. The packet type field 32 is a field in which information necessary for identifying the type of packet is recorded. The PON header content field 34 is a field in which PON header contents are recorded according to the type of the packet. The PDU field 36 is a field in which packet data is recorded according to the type of the packet.

In this embodiment, the type of packet comprises an Ethernet PDU packet, an ATM-PDU packet, a PON dedicated packet for accommodating PON functions, etc.

Figure 5:
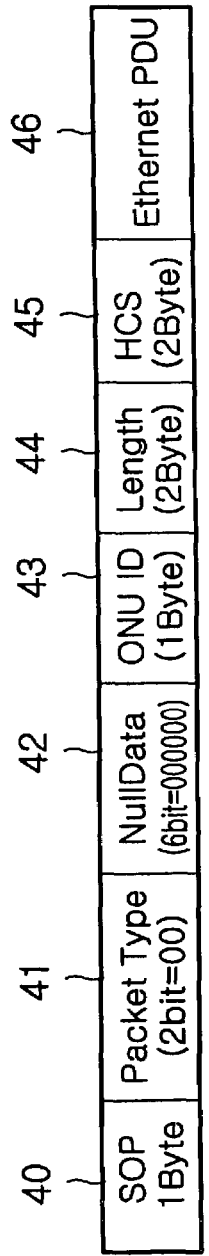
FIG. 5 is a view showing a configuration of a packet format where the type of packet corresponds to an Ethernet PDU (Packet Data Unit)

FIG. 5 is a view showing a packet format where the type of packet corresponds to an Ethernet PDU. Referring to FIG. 5, an Ethernet data frame includes an SOP field 40 and a packet type field 41 where the type of packet corresponds to the Ethernet PDU. The Ethernet data frame comprises the PON header content field 34 and an Ethernet PDU field 46. The PON header content field 34 includes a 6-bit null data field 42, a 1-byte ONU ID field 43, a 2-byte length field 44 and a 2-byte HCS (Head Check Sum) field 45. As shown in FIG. 5, two bits "00" are recorded in the packet type field 41 of the Ethernet data frame where the type of packet corresponds to the Ethernet PDU. When the OLT 20 transmits a downstream packet, an ONU ID indicating the destination of the packet is recorded in the ONU ID field 43 included in the PON header content field 34. When the ONUs 22a, 22b and 22c transmit upstream packets, an ONU ID indicating the source of each packet is recorded in the ONU ID field 43 shown in FIG. 5. Total length information including an Ethernet PDU length and a header length is recorded in the length field 44. One byte for CRC (Cyclic Redundancy Check) is recorded in the HCS field 45 so that a header error, except for the Ethernet PDU field 46, can be checked.

Figure 6:
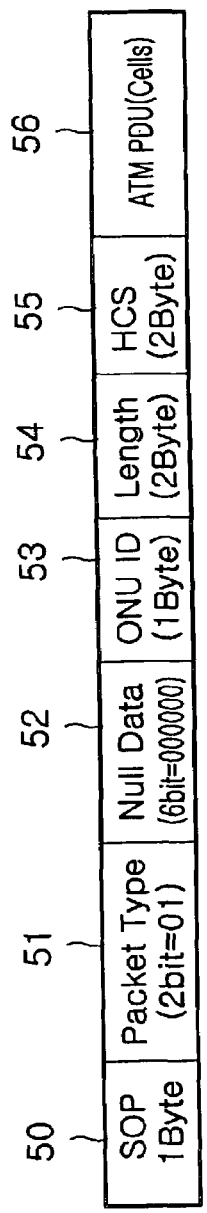
FIG. 6 is a view showing a configuration of a packet format where the type of packet corresponds to an ATM-PDU.

FIG. 6 is a view showing a packet format where the type of packet corresponds to an ATM-PDU. Referring to FIG. 6, an ATM data frame comprises an SOP field 50 and a packet type field 51 where the type of packet is the ATM-PDU. The ATM data frame comprises the PON header content field 34 and an ATM-PDU field 56. The PON header content field 34 comprises a 6-bit null data field 52, a 1-byte ONU ID field 53, a 2-byte length field 54 and a 2-byte HCS field 55. As shown in FIG. 6, two bits "01" are recorded in the packet type field 51 of the ATM data frame where the type of packet corresponds to the ATM-PDU. When the OLT 20 transmits a downstream packet, an ONU ID indicating the destination of the packet is recorded in the ONU ID field 53 included in the PON header content field 34. When the ONUs 22a, 22b and 22c transmit upstream packets, an ONU ID indicating the source of each packet is recorded in the ONU ID field 53 shown in FIG. 6. Total length information including an ATM-PDU length and a header length is recorded in the length field 54. One byte for CRC (Cyclic Redundancy Check) is recorded in the HCS field 55 so that a header error, except for the ATM-PDU field 56, can be checked.

In accordance with an embodiment of the present invention, the type of packet necessary for performing PON functions on the basis of a point-to-multipoint connection between the OLT 20 and the ONUs 22a, 22b and 22c is the PON dedicated packet. In this embodiment of the present invention, various functions to be implemented in the GE-PON system for supporting the point-to-multipoint connection comprise initial ONU registration, late ONU registration, ranging, and dynamic bandwidth allocation. Packets needed for performing the PON functions have frame formats (hereinafter, referred to as PON-function control frames) shown in FIGS. 7 to 10. Two bits "11" indicating the type of packet are recorded in packet type fields 61, 71, 81 and 91 within the PON-function control frames.

Next, the PON-function control frames are described in detail with reference to FIGS. 7 to 10. It should be understood that the PON-function control frames shown in FIGS. 7 to 10 do not include the Ethernet PDU field contained in the Ethernet data frame shown in FIG. 5 and the ATM-PDU field contained in the ATM data frame shown in FIG. 6.

Figure 7:
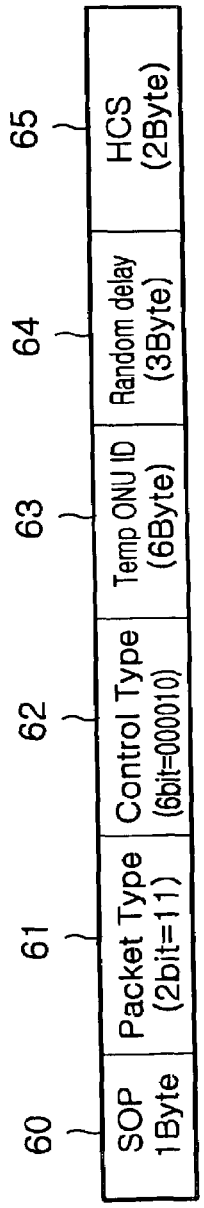
FIG. 7 is a view showing a configuration of a format of a registration request frame for an ONU registration request among the PON-function control frames.

FIG. 7 is a view showing a format of a registration request frame for an ONU registration request among the PON-function control frames. The registration request frame corresponds to an upstream packet to be used when one of the ONUs 22a, 22b and 22c requests its own registration to the OLT 20 after obtaining grant to transmit the registration request frame from the OLT 20.

Referring to FIG. 7, the registration request frame comprises an SOP field 60, a packet type field 61, a 6-bit control type field 62, a 6-byte temporary ONU ID field 63, a 3-byte random delay field 64 and a 2-byte HCS field 65. Six-bit control type information necessary for performing a PON function is recorded in the control type field 62 of the registration request frame shown in FIG. 7. A control type corresponding to a registration request in accordance with an embodiment of the present invention is defined as a value of "2(=binary data of 000010)". Therefore, the value of "2 (=binary data of 000010)" is recorded in the control type field 62 of the registration request frame. When the registration of a corresponding ONU is requested, a temporary ONU ID is recorded in the temporary ONU ID field 63 of the registration request frame. The temporary ONU ID has a 6-byte Ethernet MAC hardware address. Three-byte random delay information is recorded in the random delay field 64 so that collision between packets is avoided. However, when late registration is requested, null data of "0" is recorded in the random delay field 64 because the random delay information is not used. Two bytes for CRC (Cyclic Redundancy Check) are recorded in the HCS field 65 so that an error in the registration request frame can be checked.

Figure 8:
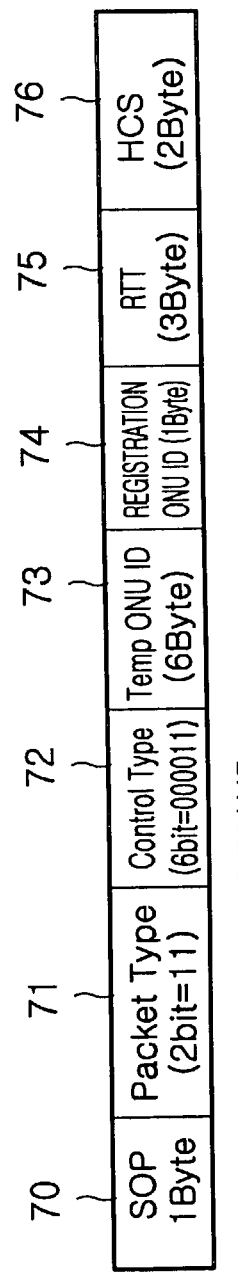
FIG. 8 is a view showing a configuration of a format of a registration response frame for an ONU registration response among the PON-function control frames.

FIG. 8 is a view showing a format of a registration response frame for an ONU registration response among the PON-function control frames. The registration response frame corresponds to a downstream packet to be used when the OLT 20 informs a corresponding ONU of a registration result after registering the corresponding ONU.

Referring to FIG. 8, the registration response frame comprises an SOP field 70, a packet type field 71, a 6-bit control type field 72, a 6-byte temporary ONU ID field 73, a 1-byte registration ONU ID field 74, a 3-byte RTT field 75 and a 2-byte HCS field 76. Six-bit control type information necessary for performing a PON function is recorded in the control type field 72 of the registration response frame shown in FIG. 8. A control type corresponding to the registration response in accordance with an embodiment of the present invention is defined as a value of "3 (=binary data of 000011)". Therefore, the value of "3 (=binary data of 000011)" is recorded in the control type field 72 of the registration response frame. When the registration of a corresponding ONU is requested, a temporary ONU ID is recorded in the temporary ONU ID field 73 of the registration response frame and a new ONU ID given by the OLT 20 is recorded in the registration ONU ID field 74. A round trip time between the OLT 20 and the corresponding ONU 22a, 22b or 22c is recorded in the RTT field 75. Two bytes for CRC are recorded in the HCS field 76 so that an error in the registration response frame can be checked.

Figure 9:
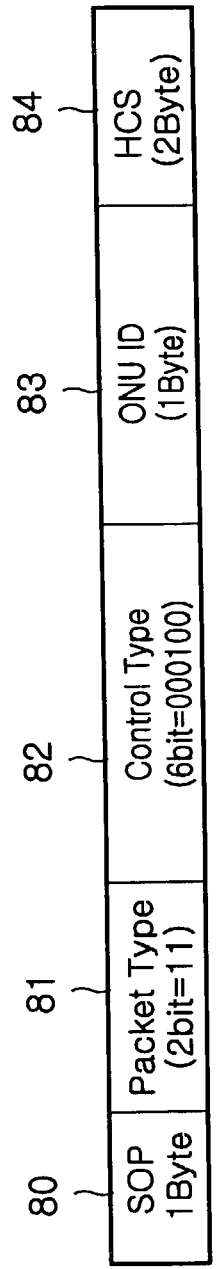
FIG. 9 is a view showing a configuration of a format of a ranging request frame for a ranging request among the PON-function control frames.

FIG. 9 is a view showing a configuration of a format of a ranging request frame for a ranging request among the PON-function control frames. The ranging request frame corresponds to an upstream packet to be used when one of the ONUs 22a, 22b and 22c requests ranging to the OLT 20 after obtaining grant to transmit the ranging request frame from the OLT 20.

Referring to FIG. 9, the ranging request frame comprises an SOP field 80, a packet type field 81, a 6-bit control type field 82, a 1-byte ONU ID field 83 and a 2-byte HCS field 84. Six-bit control type information necessary for performing a PON function is recorded in the control type field 62 of the ranging request frame shown in FIG. 9. A control type corresponding to the ranging request in accordance with an embodiment of the present invention is defined as a value of "4 (=binary data of 000100)". Therefore, the value of "4 (=binary data of 000100)" is recorded in the control type field 82 of the ranging request frame. An ID of the ONU requesting the ranging is recorded in the ONU ID field 83 of the ranging request frame. Two bytes for CRC are recorded in the HCS field 84 so that an error in the ranging request frame can be checked.

Figure 10:
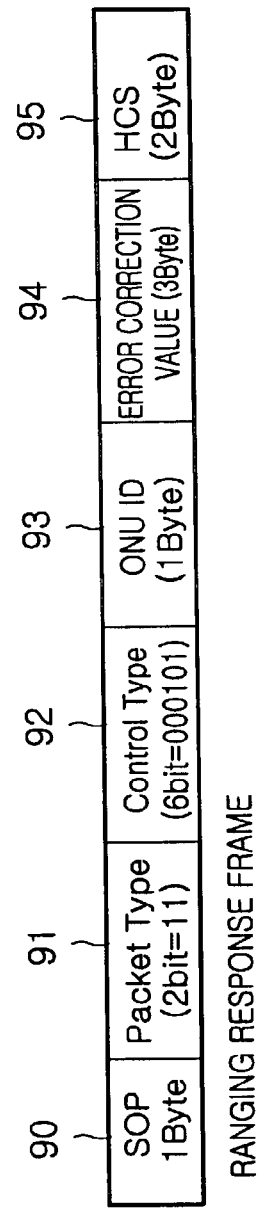
FIG. 10 is a view showing a configuration of a format of a ranging response frame for a ranging response among the PON-function control frames.

FIG. 10 is a view showing a format of a ranging response frame for a ranging response among the PON-function control frames. The ranging response frame corresponds to a downstream packet to be used when the OLT 20 informs a corresponding ONU of a ranging result.

Referring to FIG. 10, the registration response frame includes an SOP field 90, a packet type field 91, a 6-bit control type field 92, a 1-byte ONU ID field 93, a 3-byte error correction value field 94 and a 2-byte HCS field 95. Six-bit control type information necessary for performing a PON function is recorded in the control type field 92 of the ranging response frame shown in FIG. 10. A control type corresponding to the ranging response in accordance with an embodiment of the present invention is defined as a value of "5 (=binary data of 000101)". Therefore, the value of "5 (=binary data of 000101)" is recorded in the control type field 92 of the ranging response frame. An ID of the ONU requesting the ranging is recorded in the ONU ID field 93 of the ranging response frame and a 3-byte error correction value is recorded in the error correction value field 94 after the ranging. Two bytes for CRC are recorded in the HCS field 95 so that an error in the ranging response frame can be checked.

Figure 11:
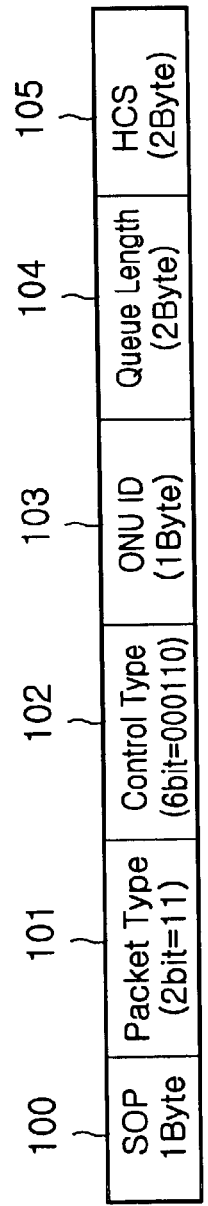
FIG. 11 is a view showing a configuration of a format of a bandwidth allocation request frame for a bandwidth allocation request among the PON-function control frames.

FIG. 11 is a view showing a format of a bandwidth allocation request frame for a bandwidth allocation request among the PON-function control frames. The bandwidth allocation request frame corresponds to an upstream packet to be used when one of the ONUs 22a, 22b and 22c requests bandwidth allocation to the OLT 20 after obtaining grant to transmit the bandwidth allocation request frame from the OLT 20.

Referring to FIG. 11, the bandwidth allocation request frame comprises an SOP field 100, a packet type field 101, a 6-bit control type field 102, a 1-byte ONU ID field 103, a 2-byte queue length field 104 and a 2-byte HCS field 105. Six-bit control type information necessary for performing a PON function is recorded in the control type field 102 of the bandwidth allocation request frame shown in FIG. 11. A control type corresponding to the bandwidth allocation request in accordance with an embodiment of the present invention is defined as a value of "6 (=binary data of 000110)". Therefore, the value of "6 (=binary data of 000110)" is recorded in the control type field 102 of the bandwidth allocation request frame. An ID of the ONU requesting the bandwidth allocation is recorded in the ONU ID field 103 of the bandwidth allocation request frame and information indicating a size of buffers on transmission standby in the ONU requesting the bandwidth allocation is recorded in a queue length field 104. Two bytes for CRC are recorded in the HCS field 105 so that an error in the bandwidth allocation request frame can be checked.

Figure 12:
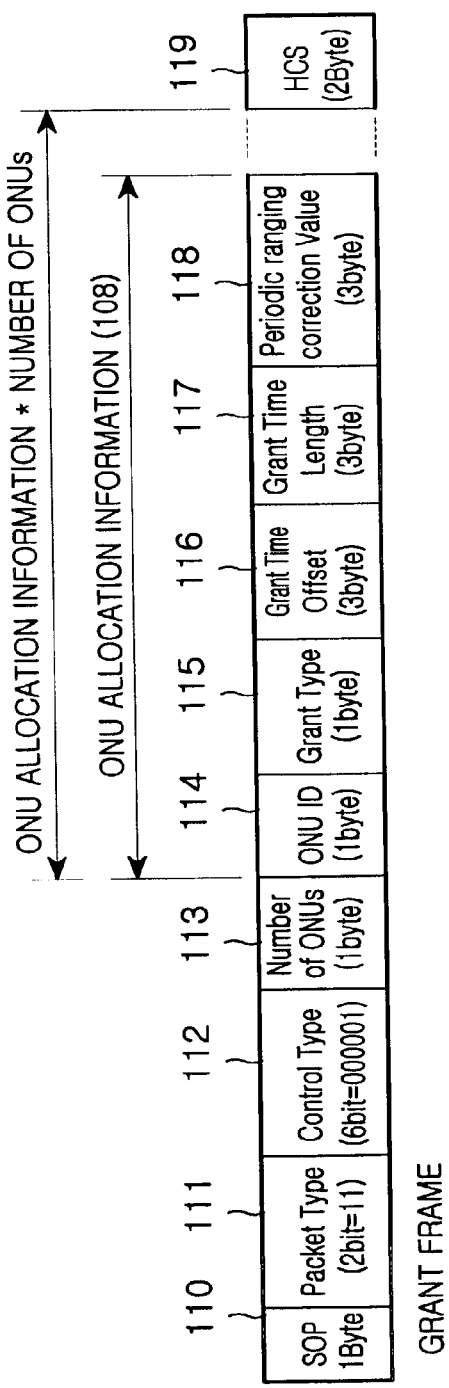
FIG. 12 is a view showing a configuration of a format of a frame to be used for granting an opportunity to transmit upstream data among the PON-function control frames.

FIG. 12 is a view showing a format of a frame to be used for granting an opportunity to transmit upstream data among the PON-function control frames. Hereinafter, the frame to be used for granting an opportunity to transmit upstream data is referred to as a grant frame. The grant frame shown in FIG. 12 corresponds to a downstream packet to be used when the OLT 20 grants a corresponding ONU the opportunity to transmit the upstream data.

Referring to FIG. 12, the grant frame comprises an SOP field 110, a packet type field 111, a 6-bit control type field 112, a 1-byte field 113 indicating the number of ONUs, a 1-byte ONU ID field 114, a 1-byte grant type field 115, a 3-byte grant time offset field 116, a 3-byte grant time length field 117, a 3-byte periodic ranging correction value field 118 and a 2-byte HCS field 119. The 1-byte ONU ID field 114, the 1-byte grant type field 115, the 3-byte grant time offset field 116, the 3-byte grant time length field 117 and the 3-byte periodic ranging correction value field 118 are defined as ONU allocation information 108. The ONU allocation information 108 in the grant frame exists for each ONU.

Six-bit control type information necessary for performing a PON function is recorded in the control type field 112 of the grant frame shown in FIG. 12. A control type corresponding to the response to the ranging request in accordance with an embodiment of the present invention is defined as a value of "1 (=binary data of 000001)". Therefore, the value of "1 (=binary data of 000001)" is recorded in the control type field 112 of the grant frame. Information indicating the number of ONUs to which the OLT 20 grants the opportunity to transmit the upstream data is recorded in the field 113 of the grant frame. An ONU receiving the grant frame uses the information indicating the number of ONUs to obtain a packet length. An ID of the ONU receiving the grant frame is recorded in the ONU ID field 114 and grant type information is recorded in the grant type field 115. In an embodiment of the present invention, a type of grant is defined as "1(00000001)" indicating a grant of an initial registration request, "2(00000010)" indicating a grant of a late registration request, "3(00000011)" indicating a grant of a ranging request, "4(00000100)" indicating a grant of a bandwidth allocation request or "5(000000101)" indicating a grant of a data request. Information indicating a point when an ONU starts data transmission is recorded in the grant time offset field 116. Information indicating a transmission time length is recorded in the grant time length field 117. A periodic ranging correction value is recorded in the periodic ranging correction value field 118. Two bytes for CRC are recorded in the HCS field 119 so that an error in the grant frame can be checked.

Figure 13:
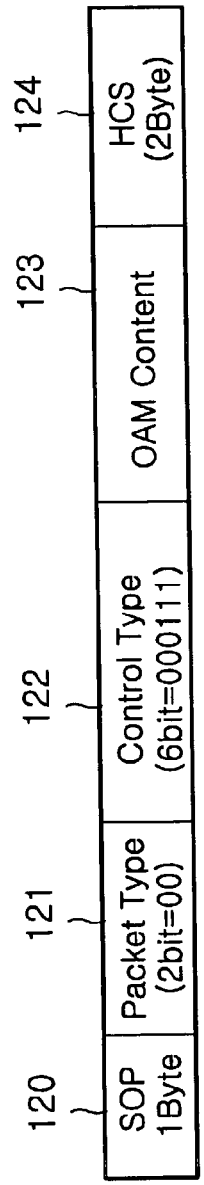
FIG. 13 is a view showing a configuration of a format of an OAM (Operations, Administration and Maintenance) frame among the PON-function control frames.

FIG. 13 is a view showing a format of an OAM (Operations, Administration and Maintenance) frame among the PON-function control frames. The OAM frame corresponds to a packet to be used for enabling the OLT 20 and the ONUs 22a, 22b and 22c to communicate with each other.

Referring to FIG. 13, the OAM frame comprises an SOP field 120, a packet type field 121, a 6-bit control type field 122, a 1-byte OAM content field 123 and a 2-byte HCS field 124. Six-bit control type information necessary for performing a PON function is recorded in the control type field 122 of the OAM frame shown in FIG. 13. A control type for operations, administration and maintenance in accordance with an embodiment of the present invention is defined as a value of "7 (=binary data of 000111)". Therefore, the value of "7 (=binary data of 000111)" is recorded in the control type field 122 of the OAM frame. OAM contents are recorded in the OAM content field 123. Two bytes for CRC are recorded in the HCS field 124 so that an error in the OAM frame can be checked.

In the embodiments of the present invention described above, the GE-PON system performs various functions such as initial ONU registration, late ONU registration, ranging, dynamic bandwidth allocation, etc. in connection with the variable-length Ethernet frames.

Figure 14:
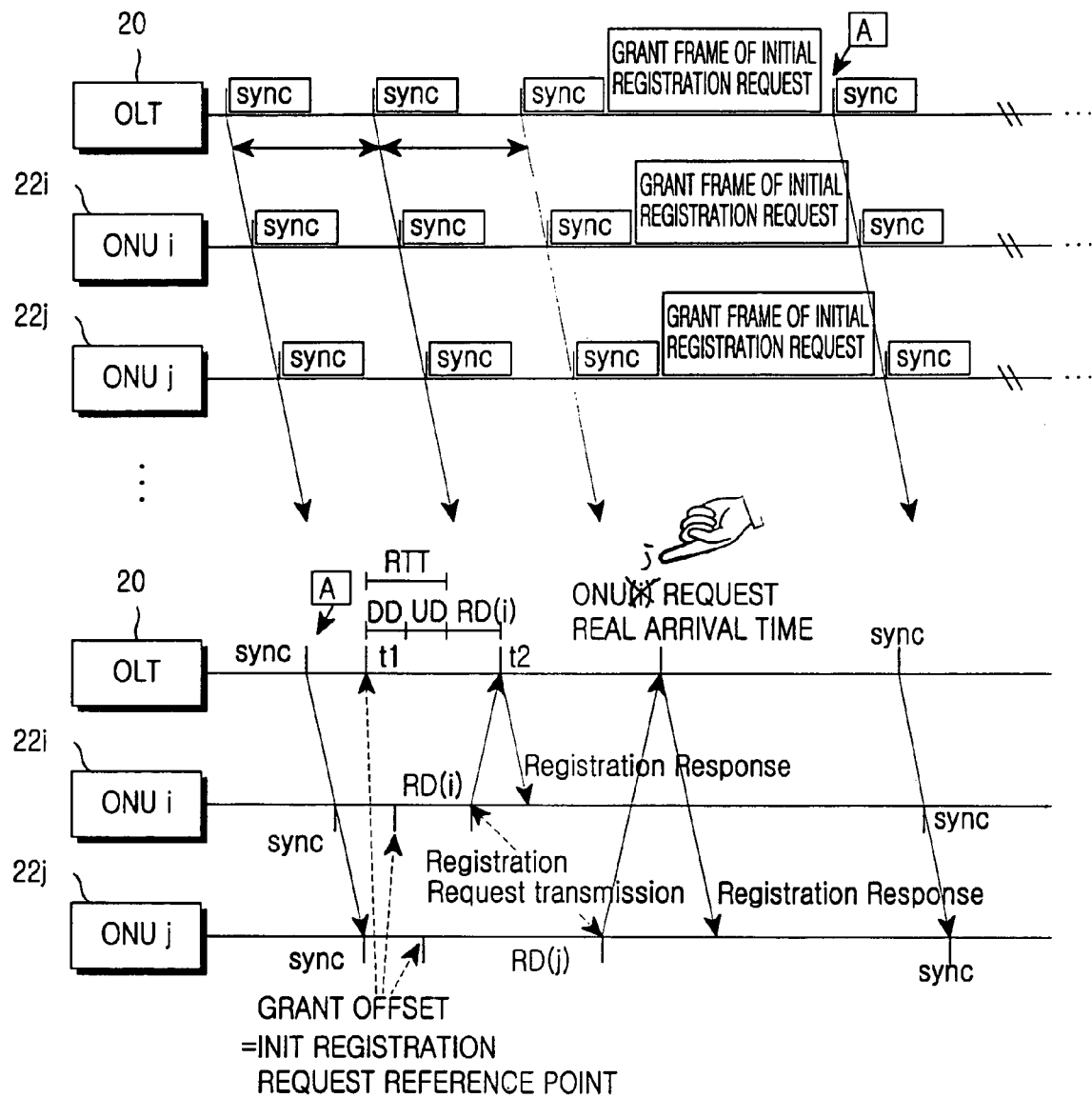
FIG. 14 is a view explaining an initial ONU registration procedure.
Figure 15:
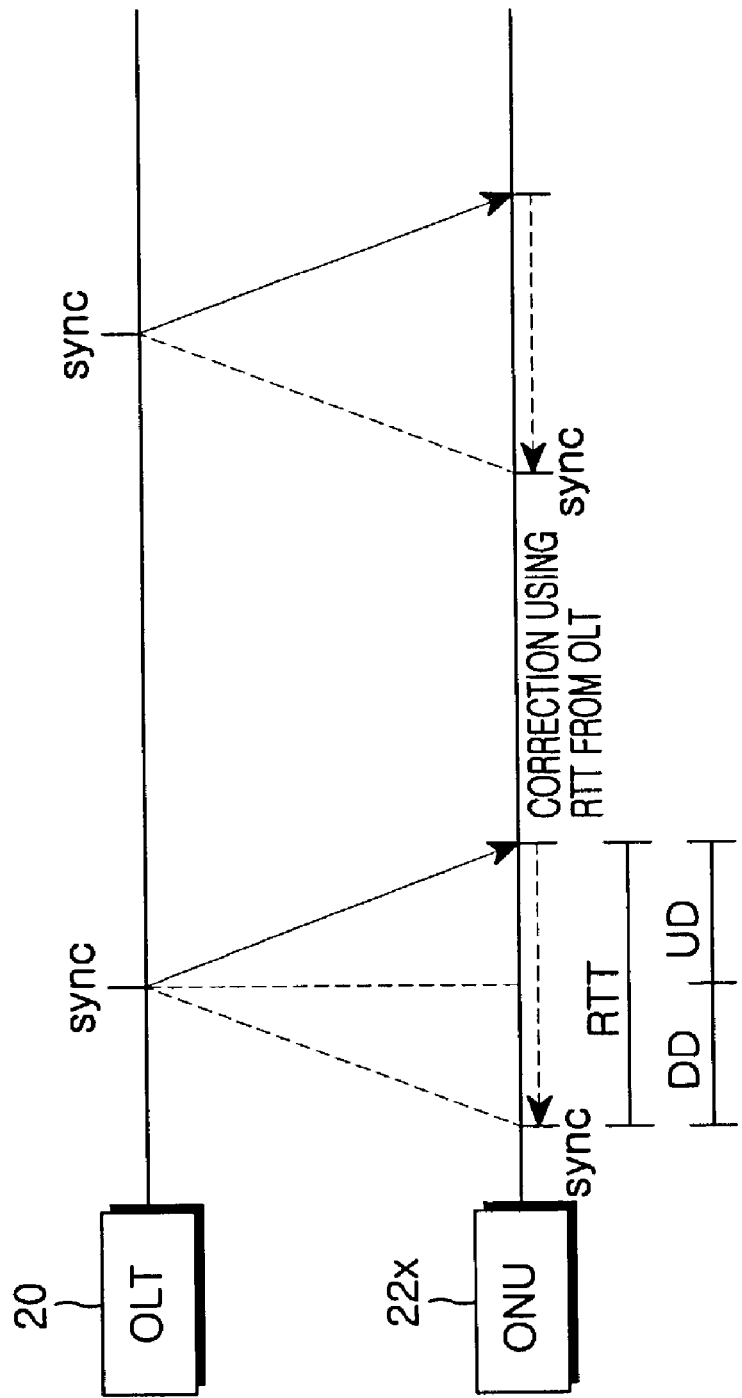
FIG. 15 is a view explaining a procedure for correcting a synchronous error due to upstream and downstream transmission delays using a round trip time.
Figure 16:
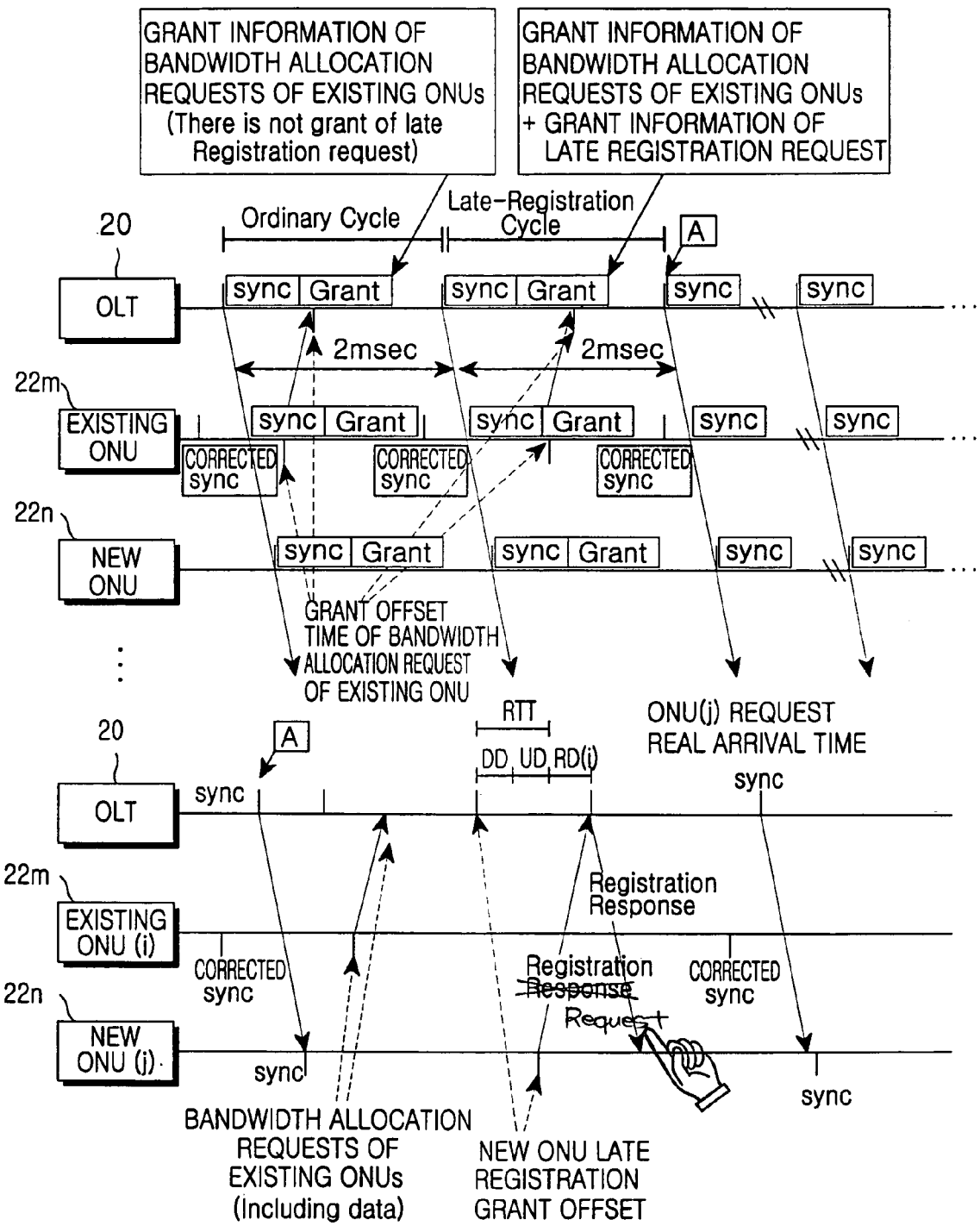
FIG. 16 is a view explaining a late ONU registration procedure.
Figure 17:
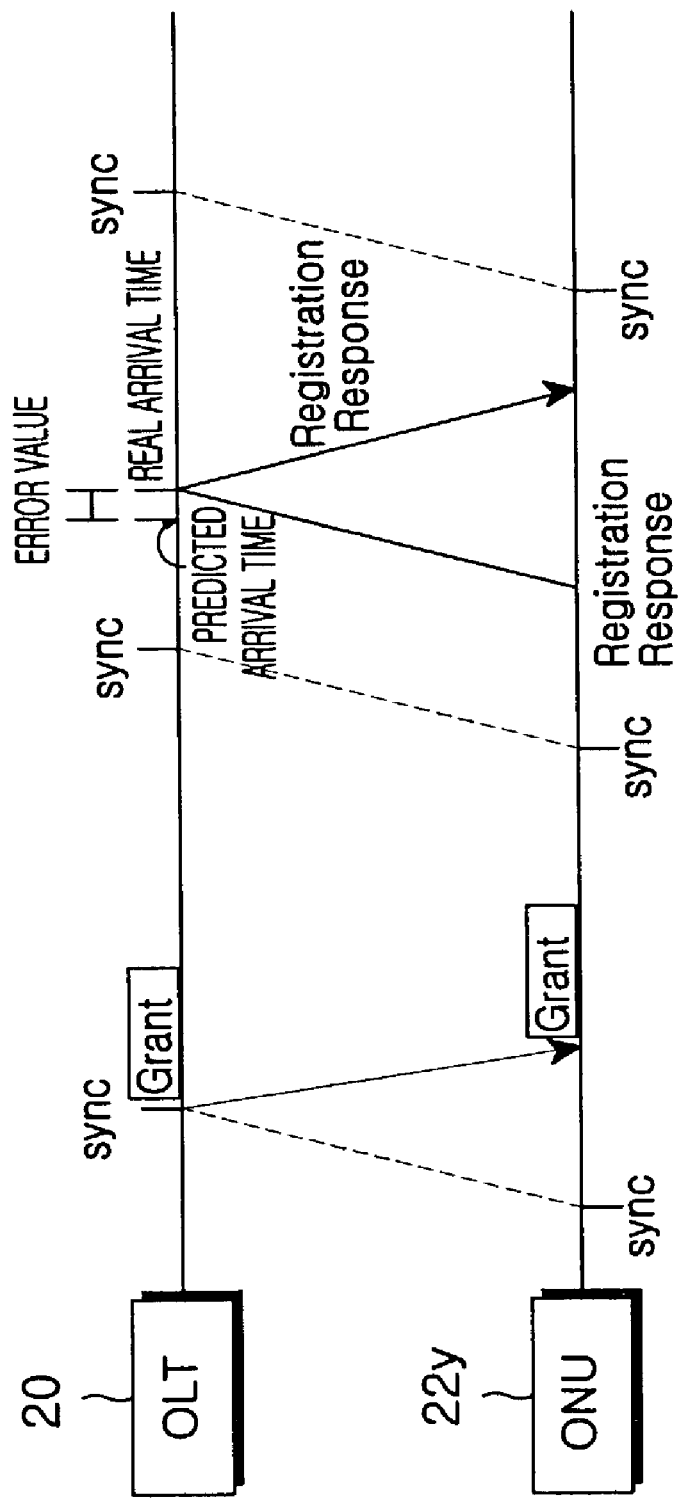
FIG. 17 is a view explaining an initial ranging procedure.
Figure 18:
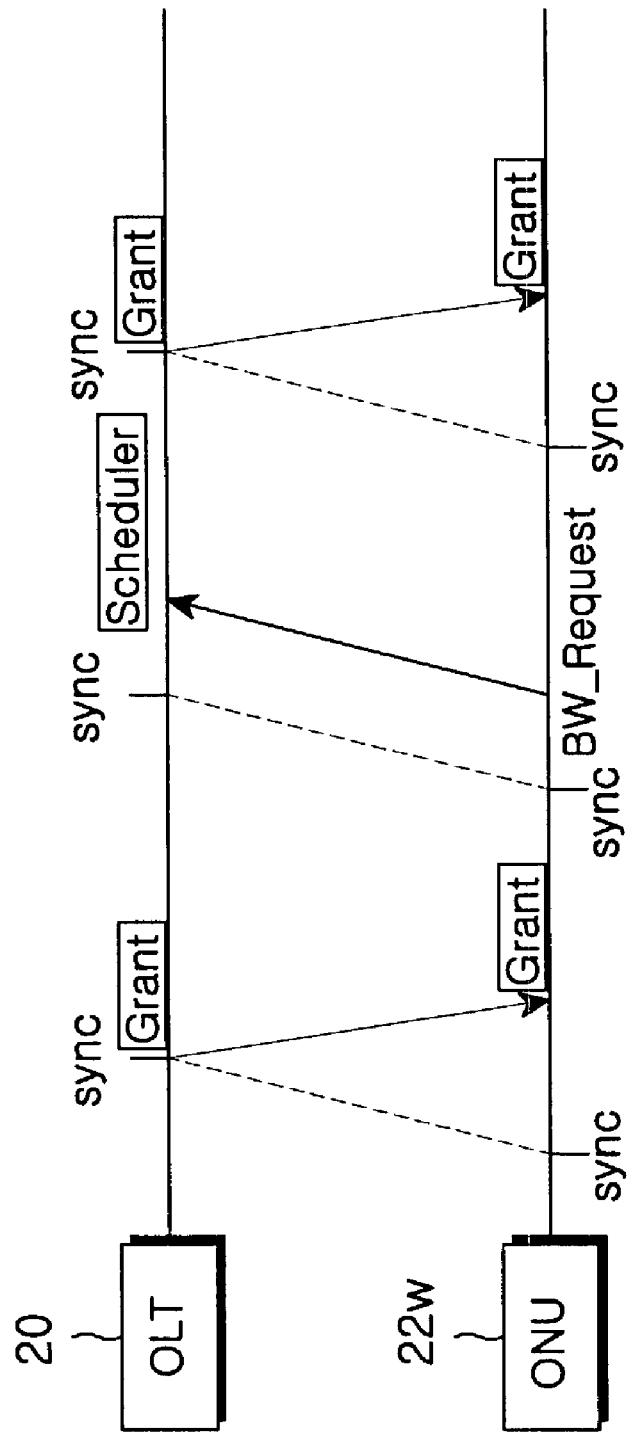
FIG. 18 is a view explaining a dynamic bandwidth allocation procedure.

FIG. 14 is a view explaining an initial ONU registration procedure. FIG. 15 is a view illustrating a procedure for correcting a synchronous error due to upstream and downstream transmission delays using a round trip time. FIG. 16 is a view illustrating a late ONU registration procedure. FIG. 17 is a view illustrating an initial ranging procedure. FIG. 18 is a view illustrating a dynamic bandwidth allocation procedure.

A synchronous signal "sync", shown in FIGS. 14 to 18, is a signal for adjusting a cycle period between the OLT 20 and the ONUs 22a, 22b and 22c and the synchronous signal "sync" is periodically transmitted from the OLT 20. In accordance with an embodiment of the present invention, the cycle period between synchronous signals "sync" is preferably set to 2 msec. The reason for setting the cycle period between the synchronous signals "sync" to 2 msec is as follows. If the cycle period is shorter, overhead increases. Further, if the cycle period is longer, the access time interval from respective ONUs is longer. If so, the QoS can degrade and the OAM function cannot be appropriately performed. Therefore, the cycle period between synchronous signals "sync" is set by trade-off of overhead vs. QoS. In the embodiment of the present invention, the synchronous signal "sync" is not defined by a particular frame format, but it can be implemented by a frame format having a particular bit pattern.

Initial ONU Registration Procedure

First, the initial ONU registration procedure in accordance with an embodiment of the present invention is described in detail with reference to FIG. 14.

Referring to FIG. 14, the OLT 20 transmits synchronous signals "sync" to ONUs 22i and 22j periodically (e.g., every 2 msec) after initial drive. The ONUs 22i and 22j (here, i or j is a, b or c as a natural number and i≠j) are synchronized with the OLT 20 in response to one of the synchronous signals "sync", periodically transmitted by the OLT 20. The ONUs 22i and 22j, in synchronization with the OLT 20, wait for the grant frame. The ONUs 22i and 22j check whether the value of the grant type field 115 in the grant frame shown in FIG. 12 is set to a value of "1(00000001)" indicating the grant of the initial registration request. If the value of the grant type field 115 is set to the value of "1(00000001)" indicating the grant of the initial registration request, the ONUs 22i and 22j identify a transmission start time of the initial registration request frame and a transmission time length, which are recorded in the grant time offset field 116 and the grant time length field 117, respectively. The ONU 22i or 22j transmits the registration request frame as the initial registration request frame shown in FIG. 7 to the OLT 20 after a random delay to avoid collision of initial registration request frames transmitted from the ONUs 22i and 22j at a transmission time of the initial registration request frame. When the initial registration request frame is transmitted, the ONU 22i or 22j records the Ethernet MAC hardware address of 6 bytes as the temporary ONU ID in the temporary ONU ID field 63 of FIG. 7 in order to indicate which ONU transmitted the initial registration request frame. Further, the ONU 22i or 22j records a random delay value RD(x) (x=i or j) of 3 bytes necessary for calculating an RTT recorded in the random delay field 64 shown in FIG. 7.

In response to the initial registration request frame, the OLT 20 calculates a difference between a predicted frame arrival time t1 and a real frame arrival time t2, wherein the predicted frame arrival time t1 is predicted from the transmission start time of the initial registration request frame indicated in the grant frame. Further, the OLT 20 calculates the RTT using the random delay value RD(x) (x=i or j) recorded in the random delay field 64 of the initial registration request frame by the ONU 22i or 22j. The RTT has a DD (Downstream Delay) time and a UD (Upstream Delay) time. The RTT is a value of (the real frame arrival time t2 —the predicted frame arrival time t1—the random delay value RD(x)). After calculating the RTT, the OLT 20 registers the ONUs 22i and 22j requesting the ONU registration in an ONU list. The OLT 20 gives new ONU IDs to the ONUs 22i and 22j. The OLT 20 records the temporary ONU ID, i.e., the Ethernet MAC hardware address set by the ONU requesting the ONU registration in the temporary ONU ID field 73 of the registration response frame shown in FIG. 8. The OLT 20 records a new ONU ID in the registration ONU ID field 74. The OLT 20 records the calculated RTT to be used for correcting an upstream or downstream transmission RTT in the RTT field 75. Two bytes for CRC are recorded in the HCS field 65 so that an error in the registration response frame can be checked.

The OLT 20 transmits the registration response frame shown in FIG. 8 including the new ONU ID and the RTT to a corresponding ONU 22x (x=i or j). When the corresponding ONU 22x (x=i or j) receives the registration response frame shown in FIG. 8, it corrects a synchronous error due to the DD and UD using the RTT in the registration response frame received from the OLT 20 as shown in FIG. 15. The ONU 22x corrects the synchronous error by processing a synchronous signal reception point as a point, which makes the RTT faster the point when it actually receives the synchronous signal.

The OLT 20 continuously transmits the initial registration grant frame for a constant period (e.g., several tens of times) so that the ONUs 22i and 22j can have sufficient opportunities for the initial registration. However, if the ONU has not performed its own initial registration, it can perform its own registration using the late ONU registration procedure described below.

Late ONU Registration Procedure

The late ONU registration procedure in accordance with an embodiment of the present invention is described in detail with reference to FIG. 16. The late ONU registration procedure gives a late registration opportunity to a new ONU while the OLT 20 and the ONUs 22a, 22b and 22c communicate with each other.

Referring to FIG. 16, the OLT 20 periodically transmits synchronous signals "sync" and downstream grant information shown in FIG. 12. Existing ONUs 22m receive the downstream grant information and transmit upstream information (real subscriber data).

When a new ONU 22n besides the existing ONUs is driven, the new ONU 22n is synchronized with the OLT 20 in response to one of synchronous signals "sync" periodically transmitted by the OLT 20. The ONU 22n in synchronization with the OLT 20 waits for the grant frame shown in FIG. 12. The ONU 22n checks a value of the grant type field 115 included in the grant frame shown in FIG. 12. If the value of the grant type field 115 is set to the value of "2(00000010)" indicating the grant of the late registration request, the ONU 22n identifies a transmission start time of the late registration request frame and a transmission time length, which are recorded in the grant time offset field 116 and the grant time length field 117, respectively. The ONU 22n transmits the registration request frame as the late registration request frame shown in FIG. 7 to the OLT 20 at the transmission time of the late registration request frame. When the late registration request frame is transmitted, the ONU 22n records the Ethernet MAC hardware address of 6 bytes as the temporary ONU ID in the temporary ONU ID field 63 in order to indicate which ONU transmitted the late registration request frame. After the ONU 22n records a random delay value of "0" in the random delay field 64, the late registration request frame is transmitted. Since a high bandwidth cannot be allocated to the late registration request differently from the initial registration request, the random delay value is not used.

Where several ONUs become simultaneously newly driven and a frame collision is caused between the transmitted late registration frames, the registration response frames from the OLT 20 cannot be transmitted to the ONUs requesting the late registration. If an ONU does not receive the registration response frame, the ONU re-transmits the late registration request frame a predetermined number of times for its own late registration using a random back-off algorithm, receives a late registration grant frame and transmits the late registration request frame, thereby avoiding frame collision. When the ONU transmits the late registration request frame, it records the 6-byte Ethernet MAC hardware address as the temporary ONU ID in the temporary ONU ID field 63 in order to indicate which ONU transmitted the late registration request frame. The ONU records the 3-byte random delay value in the random delay field 64. Further, the ONU records the 3-byte random delay value in the random delay field 64.

Where the OLT 20 receives the late registration request frame without any frame collision, the OLT 20 calculates the RTT using a difference between a predicted frame arrival time t3 and a real frame arrival time t4, wherein the predicted frame arrival time t3 is predicted from the transmission start time of the late registration request frame indicated in the grant frame. The RTT has a value of (the real frame arrival time t4—the predicted frame arrival time t3). After calculating the RTT, the OLT 20 registers the ONU requesting the late registration in an ONU list. The OLT 20 gives a new ONU ID to the ONU 22n. Thereafter, the OLT 20 transmits the registration response frame including the new ONU to the ONU 22n requesting the late registration. The OLT 20 records the temporary ONU ID, i.e., the Ethernet MAC hardware address set by the ONU 22n requesting the late registration in the 6-byte temporary ONU ID field 73 of the registration response frame shown in FIG. 8 so that the ONU 22n requesting the late registration can receive the registration response frame. The OLT 20 records the new ONU ID in the registration ONU ID field 74. The OLT 20 records the calculated RTT to be used for correcting an upstream-and-downstream-transmission RTT in the 3-byte RTT field 75.

When the ONU 22n requesting the late registration receives the registration response frame shown in FIG. 8, it corrects a synchronous error due to the DD and UD using the RTT in the registration response frame received from the OLT 20 as shown in FIG. 15.

Initial Ranging Procedure

An initial ranging procedure in accordance with an embodiment of the present invention is described with reference to FIG. 17.

The OLT 20 gives an initial ranging opportunity to the registered ONUs through the initial ONU registration and the late ONU registration. The OLT 20 and the ONUs 22a, 22b and 22c correct the synchronous error due to the upstream and downstream delays, but a precision correction of an error caused by an external variation is not made. To correct an error caused by an external variation, the OLT 20 records the 1-byte ONU ID indicating an ONU having a ranging opportunity in the ONU ID field 114 of the grant frame shown in FIG. 12. The OLT 20 records a value of "3(00000011)" indicating the grant of the ranging request as a type of a grant in the grant type field 115. The OLT 20 records a periodic ranging correction value of "0" in the periodic ranging correction value field 118. The OLT 20 records a 3-byte grant start time in the grant time offset field 116 and records a 3-byte grant time length in the grant time length field 117. The OLT 20 performs the downstream transmission of the grant frame having those records.

The ONU having an upstream transmission opportunity for the ranging request performs the upstream transmission of the ranging request frame at a next ranging grant start time.

The OLT 20 receiving the ranging request frame calculates an error using a difference between a predicted frame arrival time and a real frame arrival time, wherein the predicted frame arrival time is predicted from the transmission start time of the ranging request frame indicated in the grant frame. Thereafter, the OLT 20 records the calculated error as a 3-byte error correction value in the error correction value field 94 of the ranging response frame shown in FIG. 10. The OLT 20 performs the downstream transmission of the ranging response frame including the error correction value. Therefore, if the ONU receives the ranging response frame shown in FIG. 10, it performs the precision correction of the error caused by the external variation using the error correction value recorded in the error correction value field 94.

After the initial ranging, the OLT 20 does not give an additional dynamic ranging opportunity for periodic error correction. However, the OLT 20 obtains an error using an arrival time difference of an upstream bandwidth allocation request frame shown in FIG. 11 to be generated periodically in the dynamic bandwidth allocation procedure, which is described below in connection with FIG. 18. The OLT 20 records the periodic ranging correction value of 3 bytes in the periodic ranging correction value field 118 of a next grant frame and performs the downstream transmission of the grant frame.

Dynamic Bandwidth Allocation Procedure

The dynamic bandwidth allocation procedure in accordance with an embodiment of the present invention is described with reference to FIG. 18.

The OLT 20 transmits the grant frame shown in FIG. 12 to the respective registered ONUs 22a, 22b and 22c in order to grant a bandwidth allocation request. The OLT 20 records the number of registered ONUs in the field 113 of the grant frame shown in FIG. 12. The OLT 20 records an ID of an ONU having a bandwidth allocation request opportunity in the 1-byte ONU ID field 114. The OLT 20 records a value of "4(00000100)" indicating the grant of the bandwidth allocation request in the 1-byte grant type field 115. The OLT 20 records the periodic ranging correction value in the 3-byte periodic ranging correction value field 118. Further, the OLT 20 records a grant time offset in the 3-byte grant time offset field 116. The OLT 20 records a transmission time length scheduled by a scheduler included in the OLT 20 in the grant time length field 117. The scheduler calculates an ONU-unit transmission time length on the basis of a size of buffers on transmission standby to be provided from the ONUs.

The OLT 20 transmits the grant frame shown in FIG. 12 having the information described above to the ONUs 22a, 22b and 22c. Then, the ONUs 22a, 22b and 22c have the grant for the bandwidth allocation request.

The ONU having an upstream transmission opportunity for the bandwidth allocation request records information indicating the size of buffers on the transmission standby in the 2-byte queue length field 104 of the bandwidth allocation request frame BW_Request shown in FIG. 11 at a next bandwidth allocation request time. The ONUs perform the upstream transmission of the bandwidth allocation request frame BW_Request. Thereafter, the ONUs transmits data on the transmission standby for the transmission time length on the basis of the transmission time length information scheduled.

As apparent from the above description, the present invention provides a frame format capable of effectively accommodating Gigabit Ethernet traffic in a GE-PON (Gigabit Ethernet-Passive Optical Network) system and a method for implementing various functions such as initial ONU registration, late ONU registration, ranging, and dynamic bandwidth allocation in the GE-PON system.

Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims which follow, along with their full scope of equivalents.

What is claimed is:

1. A method for implementing various functions in a GE-PON (Gigabit Ethernet-Passive Optical Network) system, the method comprising the steps of:
   a) periodically transmitting, by an OLT(Optical Line Termination), synchronous signals to the ONUs (Optical Network Units) after initial drive such that each of a plurality of ONUs is synchronized with the OLT in response to one of the synchronous signals periodically transmitted;
   b) identifying, by the ONU synchronized with the OLT, a transmission start time of an initial registration request frame and a transmission time length included in a grant frame such that the ONU transmits the initial registration request frame to the OLT after a random delay in order to avoid collision of initial registration request frames transmitted from the ONUs at a transmission time of the initial registration request frame;
   c) calculating, by the OLT receiving the initial registration request frame, a difference between a predicted frame arrival time and a real frame arrival time, the predicted frame arrival time being predicted from the transmission start time of the initial registration request frame indicated in the grant frame such that the OLT calculates an RTT (Round Trip Time) with a random delay value; and
   d) registering, by the OLT of the ONU requesting an ONU registration, in an ONU list after calculation of the RTT such that the OLT gives a new ONU ID to the ONU, and transmits a registration response frame including the new ONU ID and the RTT to the ONU requesting the ONU registration.

2. The method as set forth in claim 1, further comprising the step of:

e) using the RTT included in the registration response frame by the ONU receiving the registration response frame to correct a synchronous error due to a DD (Downstream Delay) and a UD (Upstream Delay).

3. The method as set forth in claim 1, further comprising the step of:
   f) before identification of the transmission start time of the initial registration request frame and the transmission time length included in the grant frame, determining by the ONU whether a value of a grant type field is set to a value indicating a grant of the initial registration request.

4. The method as set forth in claim 1, wherein the initial registration request frame includes an Ethernet MAC (Medium Access Control) hardware address identifying the ONU requesting the ONU registration as a temporary ONU ID.

5. The method as set forth in claim 1, wherein the RTT has a value of (the real frame arrival time—the predicted frame arrival time—the random delay value).

6. A method for implementing a plurality of functions in a GE-PON (Gigabit Ethernet-Passive Optical Network) system,the method comprising the steps of:
   a) transmitting and receiving data by an OLT and a plurality of ONUs, in synchronization with the OLT on the basis of synchronous signals;
   b) synchronizing at least one ONU, newly driven among the ONUs, with a synchronous signal of downstream transmission;
   c) identifying by the ONU in synchronization with the synchronous signal a transmission start time of a late registration request frame and a transmission time length included in a grant frame such that the ONU transmits the late registration request frame to the GLT at a transmission time of the late registration request;
   d) calculating by the OLT receiving the late registration request frame a difference between a predicted frame arrival time and a real frame arrival time, the predicted frame arrival time being predicted from the transmission start time of the late registration request frame indicated in the grant frame such that the GLT calculates an Round Trip Time (RTT) with a random delay value; and
   e) registering, by the GLT, the ONU requesting a late ONU registration in an ONU list after calculation of the RTT, wherein the GLT gives a new ONU ID to the ONU, and transmits a registration response frame that comprises the new ONU ID and the RTT to the ONU requesting the late ONU registration.

7. The method as set forth in claim 6, further comprising the steps of:
   f) correcting by the ONU that receives the registration response frame a synchronous error due to a DD (Downstream Delay) and a UD (Upstream Delay) with the RTT included in the registration response frame; and
   g) if the ONU does not receive the registration response frame, the ONU conducting the steps of
      i. re-transmitting the late registration request frame a predetermined number of times for its own late registration with a random back-off algorithm,
      ii. receiving a late registration grant frame, and
      iii. performing upstream transmission of the late registration request frame.

8. A method for implementing a plurality of functions in a GE-PON (Gigabit Ethernet-Passive Optical Network) system, the method comprising the steps of:

a) transmitting by the OLT grant frames to a plurality of ONUs, in order to correct an error caused by an external variation, each grant frame comprising information relating to an ID of an ONU having a ranging opportunity, a grant start time and a grant time length;

b) transmitting by the ONU receiving the grant frame a ranging request frame to the OLT at a next ranging grant start time; and c) calculating by the OLT receiving the ranging request frame an error using a difference between a predicted frame arrival time and a real frame arrival time, the predicted frame arrival time being predicted from the transmission start time of the ranging request frame indicated in the grant frame such that the OLT transmits the ranging response frame comprising an error correction value based on the calculated error to the ONU requesting ranging.

9. The method as set forth in claim 8, further comprising the step of:

d) performing by the ONU receiving the grant frame a precision correction of the error caused by an external variation using the error correction value included in the grant frame.

10. A method for implementing a plurality of functions in a GE-PON (Gigabit Ethernet-Passive Optical Network) system, the method comprising the steps of:

a) transmitting by the OLT grant frames to a plurality of ONUs, in order to grant a bandwidth allocation request, each grant frame comprising information relating to the number of registered ONUs, an ID of an ONU having a bandwidth request opportunity, a periodic ranging correction value, a grant time offset and a transmission time length;

b) transmitting by the ONU receiving the grant frame a bandwidth allocation request frame comprising information relating to a size of buffers on transmission standby at a next bandwidth allocation request time to the OLT; and c) after transmission of the bandwidth allocation request frame, transmitting by the ONU receiving the grant frame data on the transmission standby for the transmission time length on the basis of the transmission time length information to the OLT.

* * * * *

UNITED STATES PATENT AND TRADEMARK OFFICE
CERTIFICATE OF CORRECTION

PATENT NO. : 7,289,439 B2  Page 1 of 1
APPLICATION NO. : 10/306446
DATED : October 30, 2007
INVENTOR(S) : Min-Hyo Lee et al.

It is certified that error appears in the above-identified patent and that said Letters Patent is hereby corrected as shown below:

Title Page
Item [73], Assignee's address, should read as follows:

--Yeongtong-Gu.--

Signed and Sealed this

Eighth Day of April, 2008

JON W. DUDAS
*Director of the United States Patent and Trademark Office*